United States Patent
Pedain et al.

(10) Patent No.: US 6,248,415 B1
(45) Date of Patent: Jun. 19, 2001

(54) AQUEOUS POLYURETHANE DISPERSIONS HAVING IMPROVED WATER AND SOLVENT RESISTANCE

(75) Inventors: Josef Pedain, Köln; Eberhard Arning, Kaarst; Dieter Mager, Leverkusen; Lutz Schmalstieg; Ronald-Karl Jerg, both of Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/118,657

(22) Filed: Jul. 17, 1998

(30) Foreign Application Priority Data

Jul. 24, 1997 (DE) ................................ 197 31 864

(51) Int. Cl.$^7$ ........................................ C08J 3/00
(52) U.S. Cl. .................... 428/44; 428/50; 428/423.1; 428/425.1; 428/537.1; 428/908.8; 524/840
(58) Field of Search .................... 428/44, 50, 423.1, 428/425.1, 537.1, 908.8; 524/840

(56) References Cited

U.S. PATENT DOCUMENTS

| | | | |
|---|---|---|---|
| 4,670,100 | * 6/1987 | Henning | 162/135 |
| 5,319,053 | 6/1994 | Slack et al. | 528/48 |
| 5,380,792 | 1/1995 | Renk | 524/840 |
| 5,610,260 | 3/1997 | Schmalstieg et al. | 528/49 |
| 5,804,647 | * 9/1998 | Nachtkamp | 524/591 |
| 5,905,113 | * 5/1999 | Licht | 524/591 |

FOREIGN PATENT DOCUMENTS 0 566 037    10/1993   (EP) .

OTHER PUBLICATIONS

Angewandte Chemie, 82 (month unavailable) 1970, pp. 53 to 63.
Database WPI, Section CH, AN 92–410414, XP002079920, & JP 04 306218 A (Asahi Chem. Ind. Co. Ltd., Oct. 29, Oct. 1992.

* cited by examiner

Primary Examiner—Nasser Ahmad
(74) Attorney, Agent, or Firm—Joseph C. Gil; Thomas W. Roy

(57) ABSTRACT

The present invention relates to aqueous polyurethane dispersions prepared from a polyisocyanate component and one or more isocyanate-reactive compounds wherein at least 5% by weight of polyisocyanate component is a diisocyanate corresponding to formula (I)

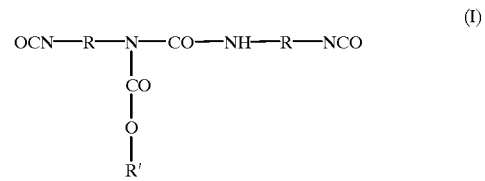

wherein
R is a difunctional, $C_4$ to $C_{18}$, aliphatic, cycloaliphatic or aromatic hydrocarbon residue obtained by removing the NCO groups from an organic diisocyanate and
R' is a monofunctional, $C_1$ to $C_{18}$ hydrocarbon radical, which may contain ether oxygen atoms.

The present invention also relates to the use of these PUR dispersions for coating any substrates, preferably wood substrates, such as parquet flooring.

3 Claims, No Drawings

AQUEOUS POLYURETHANE DISPERSIONS HAVING IMPROVED WATER AND SOLVENT RESISTANCE

BACKGROUND OF THE INVENTION

1. Field of the Invention

This invention relates to aqueous polyurethane (PUR) dispersions having improved water and solvent resistance and to their use for coating substrates, in particular wood substrates.

2. Description of the Prior Art

Aqueous dispersions of polyurethanes or polyurethane foamed materials, which are described as PUR dispersions for simplicity, are known (see Angewandte Chemie, 82, (1970), pages 53 to 63, for example), and exhibit a high level of quality. They are used on a large scale for lacquers and coatings and fulfil stringent demands for many applications.

Nevertheless, there are applications where lacquers and coatings produced from PUR dispersions do not satisfy all of the necessary requirements, e.g., the coating of wooden parts and parquet floors. Very stringent demands are imposed on surface hardness, water resistance and resistance to mixtures of water and ethanol. Another important requirement is that curing, i.e., the formation of a coating, has to take place at a relatively low temperature, generally at ambient temperature, so that the additional crosslinking obtained by curing at elevated temperature cannot occur. When applied to wooden substrates and cured at ambient temperature, prior art PUR dispersions generally form films which are insufficiently resistant to water and water/ethanol mixtures.

An object of the present invention is to provide aqueous PUR dispersions which form films or coatings having improved resistance to water and water/ethanol mixtures.

This object may be achieved by using polyisocyanates containing allophanate groups for the production of aqueous PUR dispersions.

Many literature references include polyisocyanates containing allophanate groups in lengthy lists of polyisocyanates that are suitable for preparing PUR dispersions, but these polyisocyanates have not been described in detail and no examples demonstrating their use are known.

SUMMARY OF THE INVENTION

The present invention relates to aqueous polyurethane dispersions prepared from a polyisocyanate component and one or more isocyanate-reactive compounds wherein in at least 5% by weight of polyisocyanate component is a diisocyanate corresponding to formula (I)

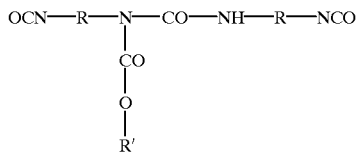

wherein

R is a difunctional, $C_4$ to $C_{18}$, aliphatic, cycloaliphatic or aromatic hydrocarbon residue obtained by removing the NCO groups from an organic diisocyanate and R' is a monofunctional, $C_1$ to $C_{18}$ hydrocarbon radical, which may contain ether oxygen atoms.

The present invention also relates to the use of these PUR dispersions for coating any substrates, preferably wood substrates, such as parquet flooring.

DETAILED DESCRIPTION OF THE INVENTION

Allophanate-modified diisocyanates are preferably used in which the R radical contains aromatic or cycloaliphatic groupings. Especially preferred are the diisocyanates described in DE-A 4,403,233 (U.S. Pat. No. 5,610,260, herein incorporated by reference). The diisocyanates described in U.S. Pat. No. 5,319,053 (herein incorporated by reference) can also advantageously be used.

In order to produce the PUR dispersions according to the invention, an allophanate-modified diisocyanate is first prepared. For this purpose, monomeric diisocyanates are reacted with a monoalcohol as described, e.g., in DE-A 4,403,233. Suitable diisocyanates include the known diisocyanates, particularly those which are commercially available. Examples include (cyclo)aliphatic diisocyanates, such as tetramethylene diisocyanate, hexamethylene diisocyanate, dodecamethylene diisocyanate, cyclohexane 1,3- and 1,4-diisocyanate, 1-isocyanato-3-isocyanatomethyl-3,5,5-trimethylcyclohexane, 4,4'-diisocyanatodicyclhexylmethane and methylcyclohexane 2,4- and 2,6-diisocyanate.

Examples of aromatic diisocyanates include 2,4- and 2,6-diisocyanatotoluene, 1,5-diisocyanatonaphthalene and 2,4'-diisocyanatodiphenylmethane, and most preferably 4,4'-diisocyanatodiphenylmethane. Mixtures of the preceding diisocyanates may also be used.

The other components which are necessary for the synthesis of the PUR dispersions according to the invention are known and have been described in the literature. They include a) polymeric polyols having a number average molecular weight (determined by end group analysis) of 400 to 6000 and b) polyols, aminopolyols or polyamines having a molecular weight of less than 400, wherein at least one of said polyols or polyamines contains an ionic group or group capable of forming an ionic group.

The ionic groups may be cationic, e.g., $N^{\oplus}$, or anionic, e.g. $SO_3^{\ominus}$ or preferably $COO^{\ominus}$. The incorporation of groups capable of forming an ionic group, such as free carboxyl groups or tert. amino groups, means that these groups can be converted into ionic groups by neutralization or quaternization to form the corresponding ionic group.

Suitable examples of the preceding isocyanate-reactive compounds are described in U.S. Pat. No. 4,701,480, herein incorporated by reference.

The polymeric polyols have an OH functionality of at least 1.8 to about 4 and include polyesters, polyester amides, polyethers, polythioethers, polycarbonates, polyacetals, polyolefins and polysiloxanes. Polyols having a number average molecular weight of 600 to 2500 and an OH functionality of 2 to 3 are preferably used.

Suitable polyols, aminopolyols or polyamines having a molecular weight of less than 400 include those which can be used as chain extenders in polyurethanes or in polyurethane dispersions. Examples include ethylene glycol, 1,4-butanediol, cyclohexanedimethanol, trimethylolpropane, glycerol, ethylenediamine, 1,4-diaminobutane, isophoronediamine and 4,4'-diaminodicyclohexylmethane.

Examples of low molecular weight polyols which are capable of forming an ionic group include dimethylolpropionic acid and N-methyl-diethanolamine.

In addition to the previously described polyols or polyamines, polyoxyalkylene ethers which contain one OH group per molecule, e.g., those prepared by the ethoxylation/ propoxylation of a monoalcohol and having a number average molecular weight of 250 to about 3000, can also be incorporated in the polyurethane. These compounds contain nonionic hydrophilic groups and provide hydrophilic properties, which improve the dispersion of the PUR in water.

The PUR dispersions are prepared in known manner. In the first step an allophanate group-containing polyisocyanate is prepared by reacting a monomeric diisocyanate and a monoalcohol to form a urethane-containing intermediate and, after adding a catalyst, converting the urethane groups to allophanate groups. The resulting diisocyanate containing allophanate groups, which is described in detail in DE-A 4,403,233, is dissolved in excess monomeric diisocyanate and is also used in the form of this solution.

In a second reaction step, the mixture of allophanate group-containing diisocyanate and monomeric diisocyanate is reacted with a polymeric polyol and with low molecular weight chain extenders to form a polyurethane. This reaction may be conducted in the presence of an organic solvent, which can be separated after the reaction, if desired.

The groups which are capable of being neutralized are subsequently converted into salt form in a third step, and the dispersion is produced by blending with water. Any remaining NCO groups still present react with water during this procedure. If a low-boiling solvent is used, it can be removed by distillation and recovered.

Depending on the degree of neutralization, the dispersion can be present in very finely divided form, so that it almost has the appearance of a solution. However, it is also possible to produce very coarse dispersions which are also stable. The solids content can also be varied within wide limits, e.g., from 20 to 50% by weight.

The PUR dispersions according to the invention are storage stable for long periods without a significant change in their properties. They can advantageously be used as binders for lacquers and coating compositions, which can be applied to any substrates, such as wood, metal, glass, plastics (which are optionally foamed), leather, paper, and textiles. For these applications, they can be combined with known coating additives such as solvents, pigments, colorants, emulsifiers, stabilizers, UV absorbers, flame retardants and levelling agents.

The PUR dispersions can also be used as adhesives for bonding polyester materials, leather, and polyurethane, and also PVC and polypropylene. The PUR dispersions may be applied by spraying, brushing, dipping or by a similar coating process, and optionally by an indirect transfer method.

The PUR dispersions according to the invention are preferably applied to wood, particularly parquet floors.

In this respect, the dispersions according to the invention exhibit significant advantages, particularly their resistance to chemical reagents, not only when compared to prior art PUR dispersions, but also when compared to aqueous binders having a different chemical structure. Another advantage is the option of being able to apply the PUR dispersions according to the invention without any volatile solvent.

The invention is further illustrated but is not intended to be limited by the following examples in which all parts and percentages are by weight unless otherwise specified.

EXAMPLES

Example 1

Production of a PUR Dispersion According to the Invention

Starting Materials

| 450 | parts | 4,4'-diphenylmethane diisocyanate (MDI) |
|---|---|---|
| 44.4 | parts | n-butanol |
| 0.025 | parts | zinc acetylacetonate (catalyst) |
| 0.05 | parts | isophthalic chloride (deactivator) |
| 420 | parts | hydroxylpolyester of adipic acid and 1,6-hexanediol having an average molecular weight of 840 |
| 5.9 | parts | 1,6-hexanediol |
| 60.3 | parts | dimethylolpropionic acid (DMPA) |
| 23.6 | parts | 27% aqueous $NH_3$ solution |
| 2288 | parts | acetone |
| 1447 | parts | water |

Procedure

The diisocyanate and catalyst were mixed and n-butanol was added at 70° C. under $N_2$. During the exothermic reaction the temperature increased to 100° C. After about 2 hours at this temperature, at which time the NCO content was 20.4%, the catalyst was rendered inactive by adding the deactivator.

The resulting diisocyanate containing allophanate groups was dissolved in a portion of the acetone (109 parts), and the hydroxyl-polyester and the 1,6-hexanediol were added. The batch was heated to 80° C. for 1 hour with stirring and a further portion of acetone (311 parts) was added followed by DMPA.

After stirring for a further 5 hours at 60° C., the mixture was diluted with acetone (234 parts) and held at 60° C. for a 1 hour. At this time the NCO content of the solution was then less than 1%. The solution was mixed with the remaining amount of acetone and with 109 parts water and was held at 50° C. for a further 3 hours. Thereafter, free NCO could no longer be detected.

The $NH_3$ solution and the remaining amount of water were then added over about 45 minutes. The mixture was held for a further 4 hours at 50° C. and then the acetone was the distilled off under reduced pressure.

A 40% aqueous dispersion was obtained, which was slightly turbid, but which appeared almost transparent as a thin layer.

Additional PUR dispersions were prepared from the following components using the procedure described in example 1:

Example 2

According to the Invention

| 450 | parts | 4,4'-diphenylmethane diisocyanate |
|---|---|---|
| 124.2 | parts | dodecanol |
| 0.025 | parts | catalyst from example 1 |
| 0.05 | parts | deactivator from example 1 |
| 420 | parts | polyester from example 1 |
| 5.9 | parts | 1,6-hexanediol |
| 60.3 | parts | DMPA |
| 23.6 | parts | $NH_3$ solution from example 1 |
| 2529 | parts | acetone |
| 1626 | parts | water. |

A 40% PUR dispersion in water was obtained, which appeared bluish-brown in transmitted light. In a Ford cup, nozzle 4, it had a run-out time of 20 seconds.

Example 3

According to the Invention

| 450 | parts | MDI |
| 44.4 | parts | n-butanol |
| 0.025 | parts | catalyst from example 1 |
| 0.05 | parts | deactivator from example 1 |
| 350 | parts | ester diol of 1,6-hexanediol and ε-caprolactone having a molecular weight of 650 |
| 5.9 | parts | 1,6-hexanediol |
| 60.3 | parts | DMPA |
| 23.6 | parts | $NH_3$ solution from example 1 |
| 2218 | parts | acetone |
| 1426 | parts | water |

A 40% PUR dispersion in water was obtained, which had a bluish sheen as a thin layer. The dispersion was fluid and easy to handle.

Example 4

Comparison

| 300 | parts | MDI |
| 420 | parts | polyester diol from example 1 |
| 5.9 | parts | 1,6-hexanediol |
| 60.3 | parts | DMPA |
| 23.6 | parts | 27% $NH_3$ solution from example 1 |
| 1834 | parts | acetone |
| 1179 | parts | water. |

A 40% PUR dispersion in water was obtained, which was slightly paste-like and turbid and had a white appearance. It exhibited slight rheopectic behavior.

All the PUR dispersions were suitable for preparing films. The films obtained from the PUR dispersions of examples 1 to 3 had outstanding mechanical properties and properties of resistance. Their resistance to water and water/ethanol mixtures was excellent. This property was tested by the following methods and compared with that of comparison example 4.

Assessment of the Resistance to Water and Alcohol

Application: The PUR dispersions were applied to glass plates by doctor blade at a wet film thickness of 120 μm (45 μm dry film thickness) and dried for 7 days at room temperature.

Test Methods

Cotton wool swabs saturated with water or ethanol (48% in water) were placed on the 7 day-old films and covered by Petri dishes.

Assessments were made after 30 minutes (water) or 9 minutes (ethanol), after the wet films had been carefully dried with domestic kitchen towels.

Explanation of the figures given in the following Table:

| Softening | Turbidity | Loss of Adhesion | Migration underneath |
|---|---|---|---|
| 0 = unchanged | 0 = unchanged clear | 0 = unchanged | 0 = unchanged |
| 1 = very slight | 1 = haze | 1 = could be scratched off with difficulty | 1 = tiny beads |
| 2 = somewhat more pronounced | 2 = turbid | 2 = could be scratched off | 2 = beads |
| 3 = easily damaged with fingernail | 3 = very turbid | 3 = could easily be scratched off | 3 = many beads |
| 4 = could be wiped off | 4 = milky | 4 = film because detached when dabbed | 4 = accumulation of liquid |

The results of this test procedure are summarized in the following Table:

Table

Testing of films after 30 minutes contact with water (1st column) and 9 minutes contact with water/ethanol (48% ethanol) (2nd column)

|  | Softening | | Turbidity | | Loss of adhesion | | Migration underneath | |
|---|---|---|---|---|---|---|---|---|
| Example 1 | 0 | 0 | 0 | 0 | 0 | 0 | 0 | 0 |
| Example 2 | 0 | 0 | 0 | 1 | 1 | 1 | 0 | 0 |
| Example 3 | 1 | 1 | 0 | 0 | 2 | 1 | 0 | 0 |
| Example 4 | 3 | 3 | 3 | 4 | 4 | 3 | 1 | 2 |

The results demonstrate that the films prepared from the PUR dispersions according to the invention exhibit significant advantages when compared to the film prepared form the PUR dispersion of comparison example 4. Due to their properties overall, they are very suitable for the wood and parquet.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous one-component polyurethane dispersion prepared from a polyisocyanate component and one or more isocyanate-reactive compounds wherein at least 5% by weight of the polyisocyanate component is a diisocyanate corresponding to formula (I)

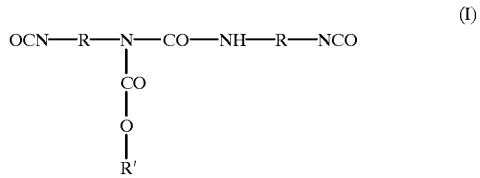

(I)

wherein
R is a difunctional, $C_4$ to $C_{18}$, aliphatic, cycloaliphatic or aromatic hydrocarbon residue obtained by removing the NCO groups from an organic diisocyanate and
R' is a monofunctional, $C_1$ to $C_{18}$ hydrocarbon radical, which may contain ether oxygen atoms.

2. A wood substrate coated with the PUR dispersion of claim 1.

3. A wood parquet floor coated with the PUR dispersion of claim 1.

* * * * *